United States Patent
Sheffield, Jr. et al.

(10) Patent No.: US 7,641,167 B2
(45) Date of Patent: Jan. 5, 2010

(54) PORTABLE ITEM HOLDER, DISPLAY DEVICE, AND AROMATIC DEVICE

(75) Inventors: Douglas M. Sheffield, Jr., Chesterfield, MO (US); Tamara K. Sheffield, Chesterfield, MO (US)

(73) Assignee: We-Flex, LLC, Town & Country, MO (US)

( * ) Notice: Subject to any disclaimer, the term of this patent is extended or adjusted under 35 U.S.C. 154(b) by 74 days.

(21) Appl. No.: 11/491,586

(22) Filed: Jul. 24, 2006

(65) Prior Publication Data
US 2008/0017767 A1   Jan. 24, 2008

(51) Int. Cl.
*A47G 29/00* (2006.01)
(52) U.S. Cl. .............. 248/683; 206/829; 248/309.3
(58) Field of Classification Search ........... 40/597; 248/683, 467, 205.5, 205.07, 206.2, 309.3; 269/21; 206/37.4, 37, 496, 829
See application file for complete search history.

(56) References Cited

U.S. PATENT DOCUMENTS

| | | | |
|---|---|---|---|
| 1,076,250 A | 10/1913 | Ulrich | |
| 1,556,648 A | 10/1925 | Symms | |
| 1,632,856 A | 6/1927 | Running | |
| 1,800,218 A | 4/1931 | Janda | |
| 1,883,791 A | 10/1932 | Jewell | |
| 1,922,900 A | 8/1933 | Plante | |
| 1,932,154 A | 10/1933 | Briggs | |
| 2,206,159 A | 7/1940 | Burgard | |
| 2,559,163 A | 7/1951 | MacDonald | |
| 2,815,919 A | 12/1957 | Pribil | |
| 3,237,330 A * | 3/1966 | Dinstbir | 40/593 |
| 4,052,806 A | 10/1977 | George | |
| 4,196,882 A | 4/1980 | Rognon | |
| 4,426,723 A | 1/1984 | Rouse | |
| D302,107 S | 7/1989 | Adams | |
| 4,848,542 A * | 7/1989 | Burnette et al. | 206/765 |
| 5,042,772 A | 8/1991 | Madjeski | |
| 5,077,925 A | 1/1992 | Herrera et al. | |
| 5,078,356 A | 1/1992 | Adams | |
| 5,080,941 A | 1/1992 | Kosowan | |
| D327,215 S | 6/1992 | Pestone | |

(Continued)

OTHER PUBLICATIONS

Asian Products, http://asianproducts.com/viewproduct-big_A10776030369121.htm, 2006, 1 page.

(Continued)

*Primary Examiner*—A. Joseph Wujciak, III
(74) *Attorney, Agent, or Firm*—Parks IP Law LLC; Mickki D. Murray

(57) ABSTRACT

An item holder mountable by suction on a mounting surface including a deformable and transparent body. The body includes an outer surface, an inner surface, and a periphery extending around the body and surrounding the outer surface and the inner surface. The body further includes a compartment having an opening adjacent the periphery and extending between the inner and outer surfaces for removably holding an item. The body is deformable from an undeformed shape to an actuated shape to mount the holder on the mounting surface by positioning the inner surface of the body adjacent the mounting surface when the body is undeformed thereby forming a cavity between the body and the mounting surface and deforming the body to its actuated shape thereby sealing the body against the mounting surface and forcing fluid out of the cavity to create a suction between the body and the mounting surface.

40 Claims, 5 Drawing Sheets

U.S. PATENT DOCUMENTS

| | | |
|---|---|---|
| 5,131,177 A | 7/1992 | Sy, Jr. |
| 5,133,524 A | 7/1992 | Liu |
| 5,176,346 A | 1/1993 | Liu |
| D340,181 S | 10/1993 | Adams et al. |
| 5,405,112 A | 4/1995 | Trethewey |
| 5,492,739 A | 2/1996 | Thorne et al. |
| D376,308 S | 12/1996 | Lee |
| 5,611,511 A | 3/1997 | Lee |
| D388,691 S | 1/1998 | Adams |
| 5,714,215 A * | 2/1998 | Sheffield et al. ........... 428/34.1 |
| 5,964,437 A | 10/1999 | Belokin et al. |
| D416,783 S | 11/1999 | Hampshire |
| D421,213 S | 2/2000 | Addi |
| 6,136,392 A | 10/2000 | Sheffield, Jr. et al. |
| 6,143,391 A | 11/2000 | Barnes et al. |
| D436,517 S | 1/2001 | Barry |
| 6,367,184 B1 | 4/2002 | Kheder |
| 6,375,143 B1 | 4/2002 | Burns |
| 6,446,375 B1 * | 9/2002 | Davis ........................ 40/597 |
| 6,589,093 B1 | 7/2003 | Morgan |
| 6,648,285 B1 | 11/2003 | Woollen |
| 6,869,053 B2 | 3/2005 | Adams, IV |
| 7,147,171 B2 * | 12/2006 | Harada et al. ................ 239/36 |
| 7,293,719 B2 | 11/2007 | Wheatley et al. |
| 2004/0124325 A1 | 7/2004 | Kwok |
| 2004/0211867 A1 | 10/2004 | Doyle |
| 2004/0221498 A1 | 11/2004 | Vico et al. |
| 2005/0218561 A1 | 10/2005 | Watson et al. |
| 2006/0032100 A1 * | 2/2006 | Alvarez ...................... 40/760 |
| 2006/0104933 A1 | 5/2006 | Bell et al. |

OTHER PUBLICATIONS

Presto Galaxy Suction Cups, Inc., http://www.suctioncupsinc.com, 2006, 18 pages.

Interdesign, Sapphire Orbo Photo Frame product, 1998, 4 pages, including summary sheet describing frame product.

* cited by examiner

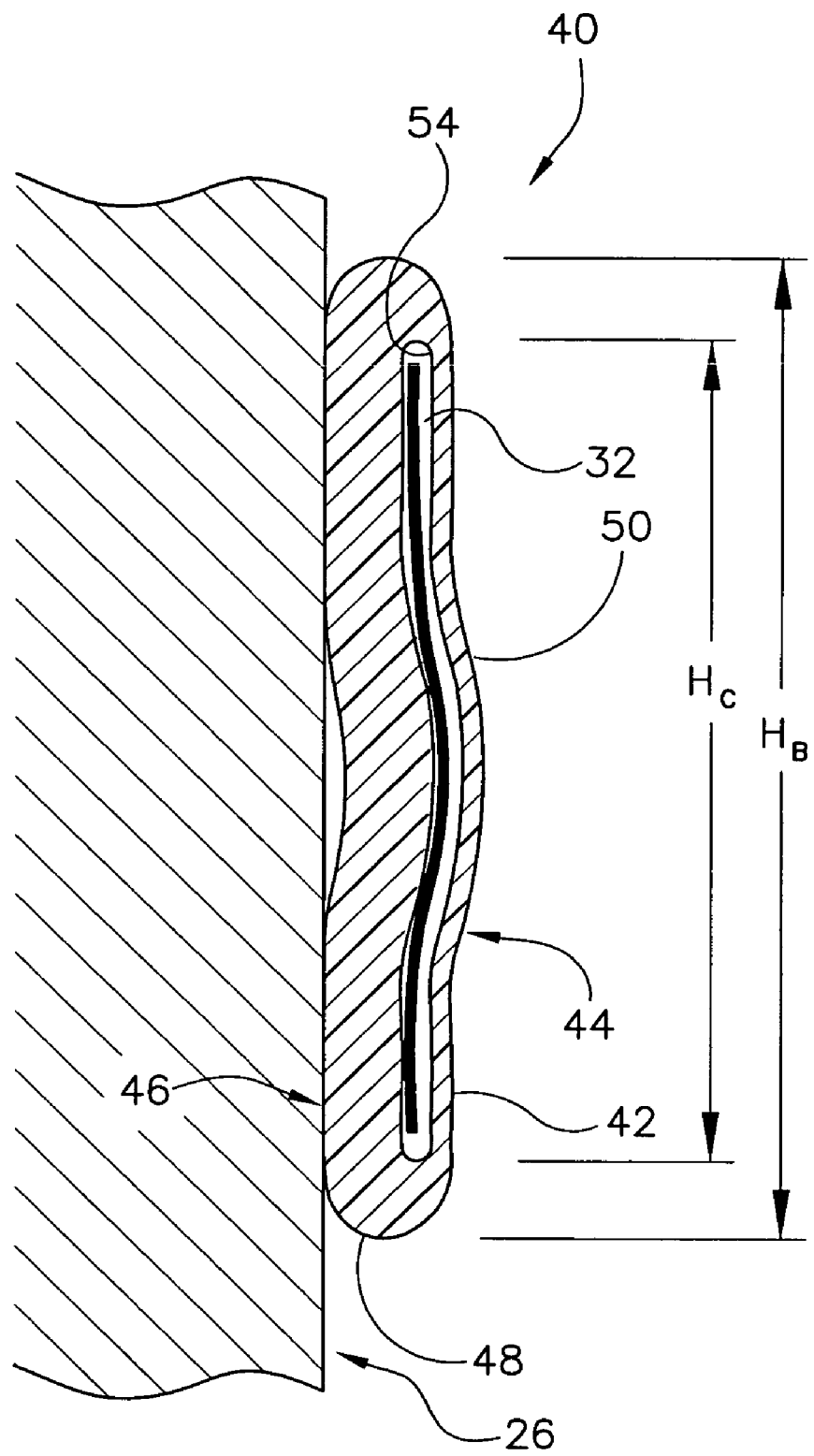

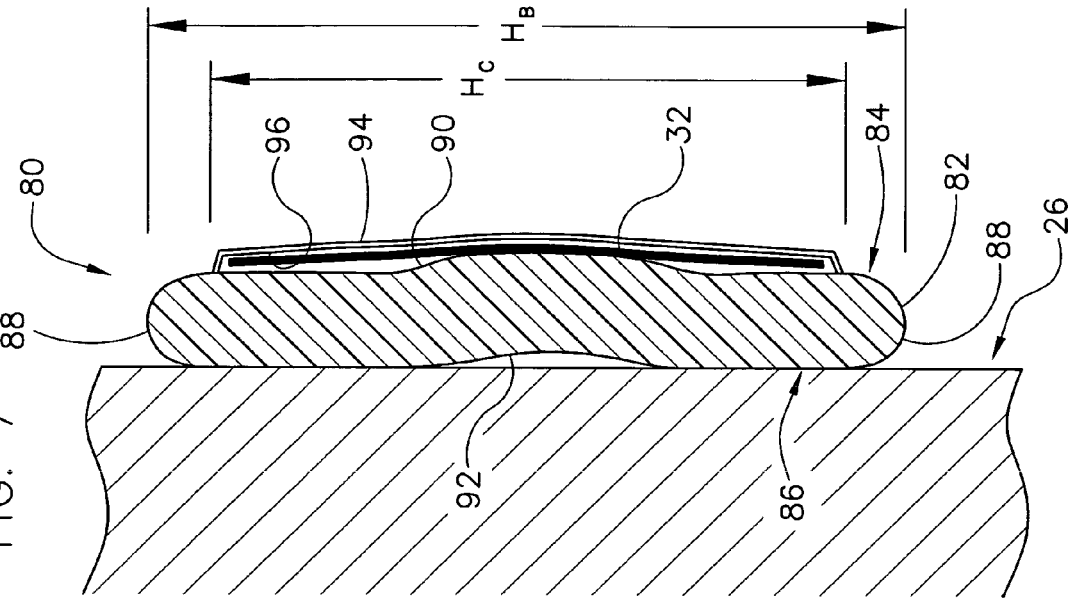
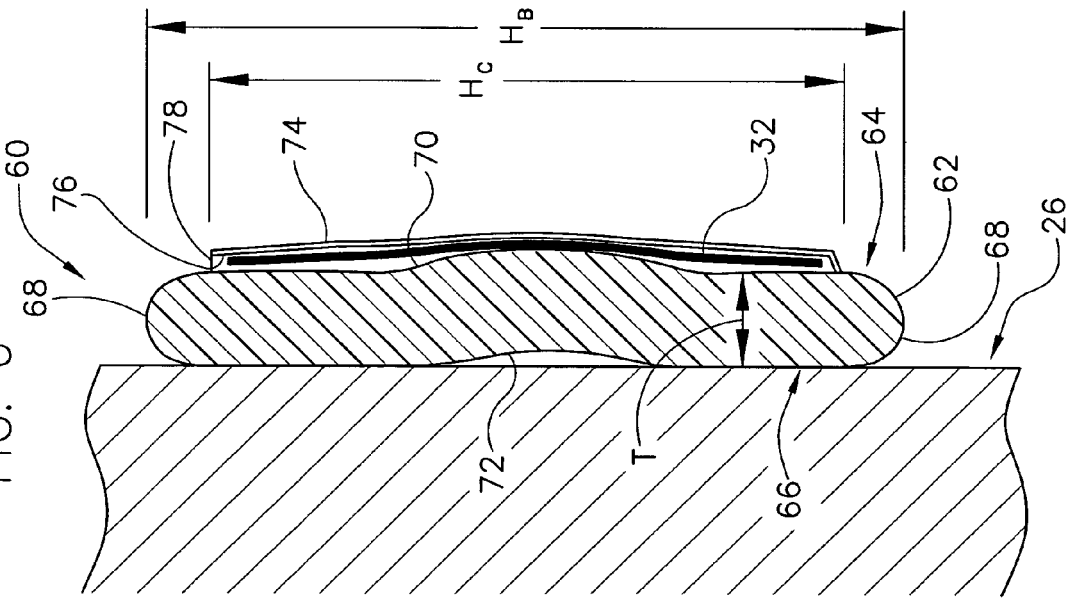

# PORTABLE ITEM HOLDER, DISPLAY DEVICE, AND AROMATIC DEVICE

BACKGROUND OF THE INVENTION

The present invention relates to item holders and display devices and, more specifically, to portable item holders, display devices, and aromatic devices that are vacuum mounted on smooth surfaces.

People often wish to display items, such as photos, collector cards (e.g., baseball cards), and pieces of art. They also often wish to have aromatic items in their environment. These people sometimes prefer to locate the item being displayed and/or providing aroma as conveniently as possible. Locating conventional display devices, such as picture frames, and conventional aromatic items, such as scented candle holders, on non-horizontal surfaces (e.g., walls) is often convenient because the devices can be appreciated while not taking up counter or shelf space.

People also sometimes desire to change a location of the item being displayed and/or providing aroma. For example, a person displaying a picture on their kitchen wall may want to instead display the picture on a wall at their workplace. As another example, a person having a scented candle hanging from a candle holder secured to their bathroom wall may want to have the scented candle in another location. However, it is not easy to change the location of conventional devices that are secured to surfaces. For example, to change the display location of an item displayed in one of many conventional picture frames, the frame must be removed from a hook on which it was hanging from and a hook must be mounted on a wall at another location for holding the frame. Further, the old hook must be used for other purposes or removed, which could leave a scar in the wall and require repair and painting. Changing the location of a scented-candle holder secured to a wall, such as by a nail, presents similar challenges.

Display devices with greater portability exist, but they have limited convenience. For example, magnetic picture frames are easily portable from one ferrous surface to another. However, such picture frames will not work where the surface is not ferrous. Further, most magnetic display devices are not aromatic. Conventional suction cups are very portable, being mountable on most smooth and non-porous surfaces. However, conventional suction cups do not have integral compartments for holding an item for displaying the item or providing a desired aroma of the item.

BRIEF SUMMARY OF THE INVENTION

The present invention relates to an item holder mountable by suction on a generally smooth mounting surface including a deformable and generally transparent body. The body includes an outer surface, an inner surface having a concave portion opposite the outer surface, and a periphery extending around the body and surrounding the outer surface and the inner surface. The deformable body further includes a compartment extending through the body between the outer surface and inner surface for removably holding an item during use of the holder. The compartment has an opening adjacent the periphery for inserting the item into the compartment and removing the item from the compartment. The body is deformable from an undeformed shape to an actuated shape to mount the holder on the mounting surface by positioning the inner surface of the body adjacent the mounting surface when the body is in its undeformed shape thereby forming a cavity between the body and the mounting surface and deforming the body to its actuated shape thereby sealing the body against the mounting surface and forcing fluid out of the cavity to create a suction between the body and the mounting surface thereby securing the body to the mounting surface.

In another aspect, the present invention relates to an item holder mountable by suction on a generally smooth mounting surface including a deformable body. The body includes an outer surface, an inner surface having a concave portion opposite the outer surface, and a periphery extending around the body and surrounding the outer surface and the inner surface. The body further includes a sealed compartment extending through the body between the outer surface and inner surface for holding an item during use of the holder. The body is deformable from an undeformed shape to an actuated shape to mount the holder on the mounting surface by positioning the inner surface of the body adjacent the mounting surface when the body is in its undeformed shape thereby forming a cavity between the body and the mounting surface and deforming the body to its actuated shape thereby sealing the body against the mounting surface and forcing fluid out of the cavity to create a suction between the body and the mounting surface thereby securing the body to the mounting surface.

In yet another aspect, the present invention relates to an item holder mountable by suction on a generally smooth mounting surface including a deformable body. The body includes an outer surface, an inner surface having a concave portion opposite the outer surface, and a periphery extending around the body and surrounding the outer surface and the inner surface. The holder further includes a film attached to the outer surface of the body for holding an item during use of the holder. The body is deformable from an undeformed shape to an actuated shape to mount the holder on the mounting surface by positioning the inner surface of the body adjacent the mounting surface when the body is in its undeformed shape thereby forming a cavity between the body and the mounting surface and deforming the body to its actuated shape thereby sealing the body against the mounting surface and forcing fluid out of the cavity to create a suction between the body and the mounting surface thereby securing the body to the mounting surface.

In still another aspect, the present invention relates to a method of using an item holder including a deformable and visually transparent body having an outer surface, an inner surface having a concave portion opposite the outer surface, a periphery extending around the body and surrounding the inner surface and outer surface, and a compartment extending through the body between the outer surface and inner surface. The method includes positioning an item in the compartment of the body thereby displaying the item through the visually transparent body of the holder. The method further includes positioning the inner surface of the body adjacent the mounting surface while the body is in an undeformed shape thereby forming a cavity between the body and the mounting surface. The method also includes moving the body to an actuated shape thereby sealing the body against the mounting surface and forcing fluid out of the cavity to create a suction between the body and the mounting surface thereby securing the body to the mounting surface. In addition, the method includes viewing the item through the body of the holder and removing the item from the compartment of the body.

In still yet another aspect, the present invention relates to a method of using an item holder including a flexible body having an outer surface, an inner surface having a concave portion opposite the outer surface, and a periphery extending around the body and surrounding the inner surface and outer surface, and including a film attached to the outer surface forming a compartment between the film and the body. The method includes positioning an item in the compartment formed by the film and the body. The method further includes positioning the inner surface of the body adjacent the mounting surface while the body is in an undeformed shape thereby forming a cavity between the body and the mounting surface. The method also includes moving the body to an actuated shape thereby sealing the body against the mounting surface and forcing fluid out of the cavity to create a suction between the body and the mounting surface thereby securing the body to the mounting surface. In addition, the method includes removing the item from the compartment.

Other aspects of the present invention will be in part apparent and in part pointed out hereinafter.

BRIEF DESCRIPTION OF THE DRAWINGS

FIG. 4 is a cross section of an item holder according to a second embodiment of the present invention shown in an actuated shape secured to the mounting surface.

FIG. 6 is a cross section of the item holder taken along line 6-6 of FIG. 5 shown in an actuated shape secured to the mounting surface.

FIG. 7 is a cross section of an item holder according to a fourth embodiment of the present invention shown in an actuated shape secured to the mounting surface.

Corresponding reference characters indicate corresponding parts throughout the several views of the drawings.

DETAILED DESCRIPTION OF THE INVENTION

Figure 1:
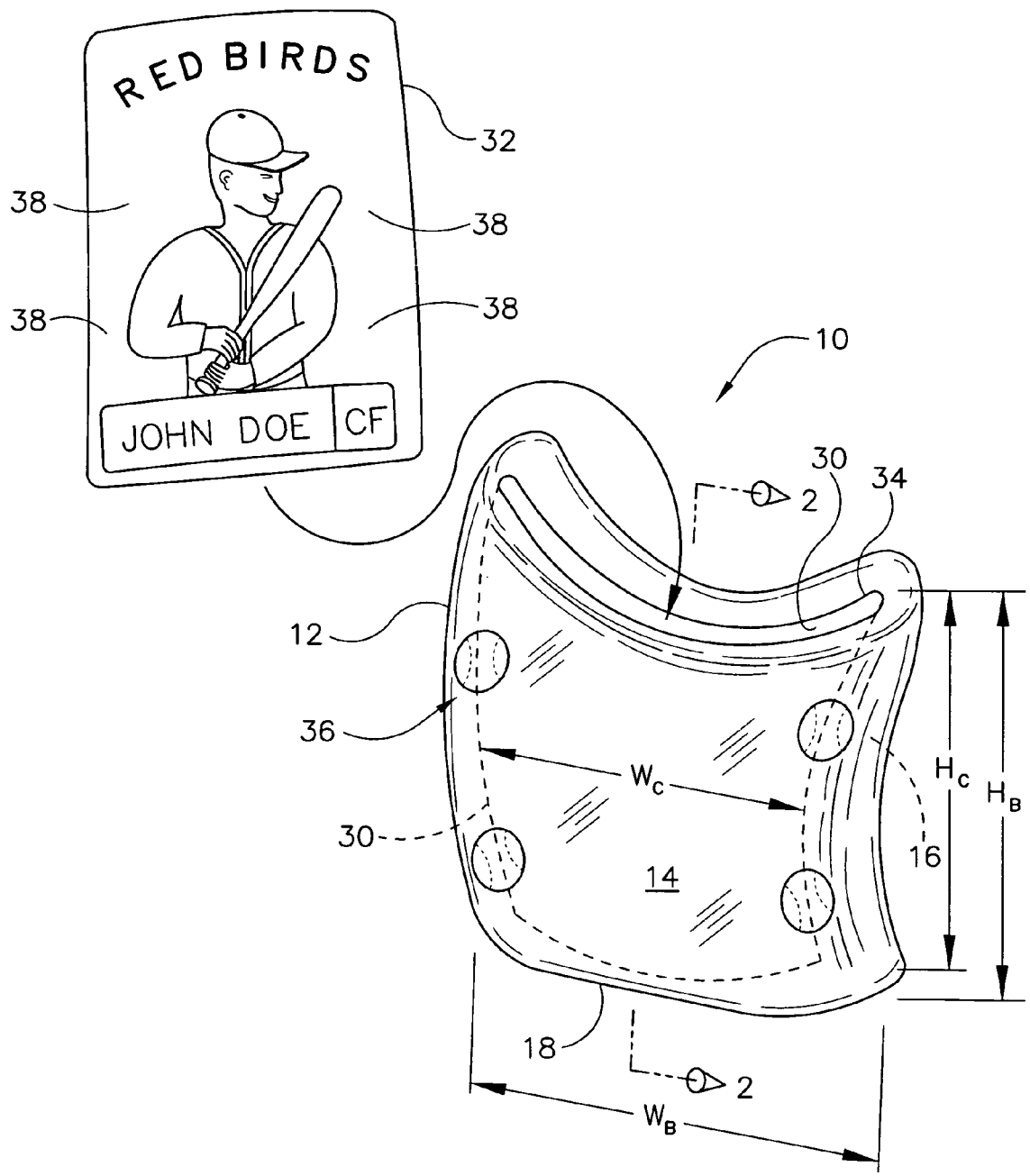
FIG. 1 is a perspective of an item holder according to a first embodiment of the present invention.
Figure 2:
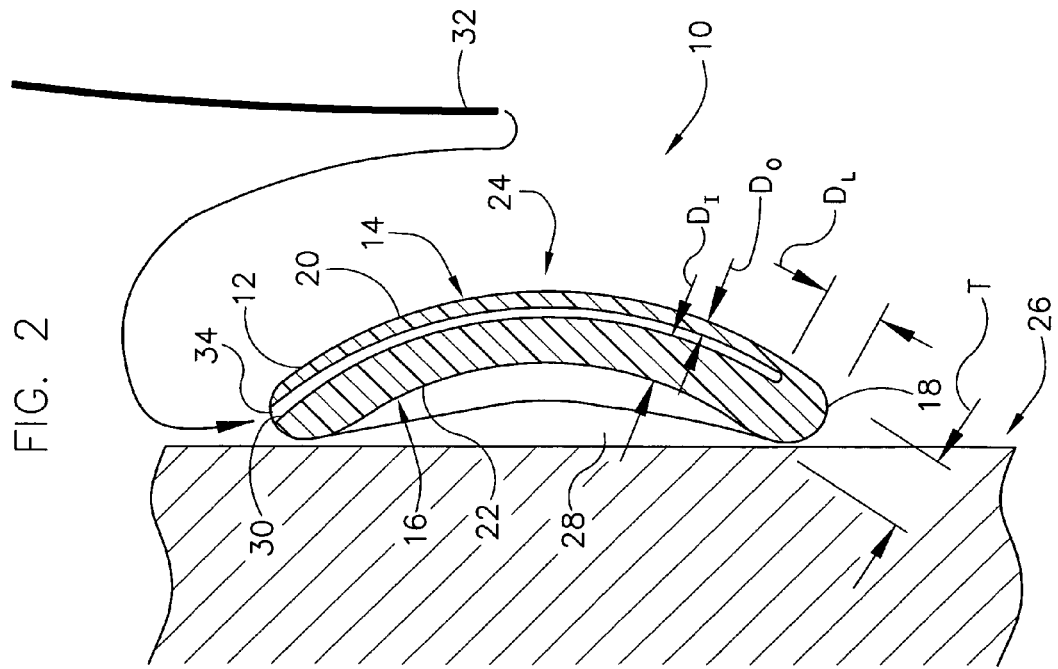
FIG. 2 is a cross section of the item holder taken along line 2-2 of FIG. 1 shown in an undeformed shape adjacent a mounting surface.

Referring to the figures, and more particularly to FIG. 1, a portable item holder and display device according to a first embodiment of the present invention is designated in its entirety by reference number 10. The item holder 10 has a flexible or deformable body 12 including an outer surface 14, an inner surface 16, and a periphery 18 extending around the body and surrounding the inner surface and the outer surface. Although the flexible body 12 may include other materials without departing from the scope of the present invention, in one embodiment the body includes a resinous thermoplastic such as polyvinyl chloride. In one embodiment, the flexible body 12 is generally visually transparent. As shown in FIG. 2, the outer surface 14 may include a convex portion 20. The inner surface 16 includes a concave portion 22 opposite the outer surface 14. For embodiments in which the outer surface 14 includes the convex portion 20, the concave portion 22 of the inner surface 16 may be opposite the convex portion. The outer surface 14 may be substantially free of protrusions such as the central knobs protruding from outer surfaces of conventional suction cups. In one embodiment, the convex portion 20 is substantially free of protrusions. The flexible body has a thickness T measured between the outer surface 14 and the inner surface 16. The thickness T may vary throughout the flexible body 12 or be generally constant. For example, the thickness T may vary from a maximum thickness of between about 0.06 inch and about 0.25 inch in a central region 24 of the convex and/or concave portions 20, 22 and a minimum thickness of between about 0.002 inch and about 0.08 inch adjacent the periphery 18. In one embodiment, the flexible body 12 has a constant thickness T of between about 0.08 inch and about 0.125 inch.

Figure 3:
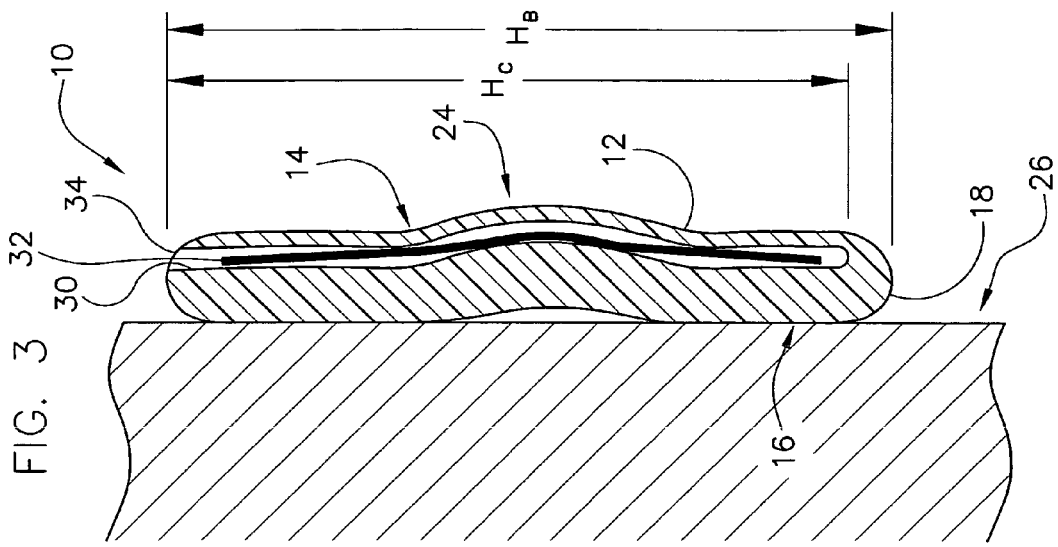
FIG. 3 is a cross section of the item holder of FIG. 2 shown in an actuated shape secured to the mounting surface.

The flexible body 12 is deformable between an undeformed or default shape, shown in FIG. 2, and an actuated shape, shown in FIG. 3, to mount the holder 10 by suction or vacuum on a generally smooth and generally non-porous mounting surface 26. The holder 10 may be secured to mounting surfaces 26 having various attitudes. For example, the holder 10 may be mounted on an upward facing or downward facing horizontal mounting surface 26. The holder 10 may also be mounted on a vertical surface 26 or on a generally upward or downward facing surface that is angled between horizontal and vertical. A mounting strength of the holder 10 depends in part on the size, shape, and material of the body 12 and characteristics of the mounting surface 26, such as smoothness and porosity.

The mounting surface 26 must include a surface area that is at least as large as an area the flexible body 12 spans when it is in its actuated shape. To mount the holder 10 on the mounting surface 26, the inner surface 16 of the flexible body 12 is positioned adjacent the mounting surface when the body is in its default shape, as shown in FIG. 2. By positioning the flexible body 12 in this way, a cavity 28 is formed between the body 12 and the mounting surface 26. Then the flexible body 12 is moved to its actuated shape (i.e., causing the inner surface 16 to conform to the mounting surface), as shown in FIG. 3, thereby sealing the body against the mounting surface 26 and forcing fluid such as air out of the cavity 28 to create the suction between the body and the mounting surface. The suction created within the sealed cavity secures the body 12 to the mounting surface 26. As the flexible body 12 is deformed toward the actuated shape, reflex or spring forces are created in the body between the convex and concave portions 20, 22 that act to return the body to its default shape. As will be appreciated by those skilled in the art, the flexible body 12 must be sized and shaped so forces created by the suction balance with or are greater than the sum of the reflex forces created in the body and any loading on the body to create and maintain the connection between the body and mounting surface 26. To demount the body 12 from the mounting surface, the user moves the body out of its actuated shape thereby breaking the seal and suction. For example, the user may pull or otherwise move a portion of the periphery 18 to break the suction and seal.

The flexible body 12 further includes a compartment 30 extending through the body between the outer surface 14 and the inner surface 16 of the body for holding an item 32 during use of the holder 10. The item 32 may be part of the holder 10 or used in combination with the holder. The compartment 30 has an opening 34 for accessing the compartment. The compartment 30 and opening 34 may be sized and shaped in various ways without departing from the scope of the present invention, as long as the suction between the holder 10 and the mounting surface 26 can be created and maintained as described above. As shown in FIG. 1, the compartment 30 may have a generally constant width $W_C$ and a generally constant height $H_C$. The opening 34 may have a width that is the same as the compartment width $W_C$. In one embodiment, the compartment width Wc is between about 22% and about 95% of a width $W_B$ of the flexible body 12. In one embodiment, the compartment height $H_C$ is between about 17% and about 95% of a height $H_B$ of the body 12. For example, in a particular embodiment, the compartment 30 has a width $W_C$ of between about 2 inches and about 8.5 inches and a height $H_C$ of between about 2 inches and about 11 inches and the body 12 has a width $W_B$ of between about 2.5 inches and about 9 inches and a height $H_B$ of between about 2.5 inches and about 11.5 inches. The compartment 30 may be sized and shaped to receive all of the item 32 so that it does not protrude from the opening 34.

The compartment 30 and opening 34 may be located in a variety of positions without departing from the scope of the present invention, as long as the suction between the holder 10 and the mounting surface 26 can be created and maintained as described above. In one embodiment, as shown in FIGS. 1 and 2, the opening 34 may be located adjacent the periphery 18. In another embodiment (not shown), the opening 34 is located at a portion of the outer surface 14 that is spaced from the periphery 18. The compartment 30 is separated from the outer surface 14 by an outer distance $D_O$, from the inner surface by an inner distance $D_I$, and from the periphery 18 by a maximum lateral distance $D_L$. In one embodiment (not shown), the compartment 30 is equidistant from the outer surface 14 and the inner surface 16 (i.e., $D_O = D_I$). FIG. 2 shows the compartment 30 being located closer to the outer surface 14 than to the inner surface 16 (i.e., $D_O < D_I$). In one embodiment, the distance $D_O$ between the compartment 30 and the outer surface 14 is between about 0.001 inch and about 0.05 inch and the distance $D_I$ between the compartment and the inner surface 16 is between about 0.001 inch and about 0.05 inch. In one embodiment, the maximum distance $D_L$ between the compartment 30 and the periphery 18 is between about 0.125 inch and about 0.25 inch. In embodiments in which the compartment 30 extends between the convex portion 20 and concave portion 22 of the body 12, as shown in FIG. 2, the compartment 30 may extend generally parallel to both portions.

The periphery 18 of the flexible body 12 may have various sizes and shapes without departing from the scope of the present invention, as long as the suction between the holder 10 and the mounting surface 26 can be created and maintained as described above. For some periphery 18 shapes, the reflex forces in the body 12 must be reduced in places to ensure secure mounting of the holder 10 on the mounting surface 26. One way to reduce reflex forces is by selectively changing body 12 thickness T. For example, the thickness T of the flexible body 12 may taper from a maximum thickness adjacent the central region 24 of the convex and concave portions 20, 22 to a minimum thickness adjacent the periphery 18, as described above, to reduce reflex forces.

It is contemplated that reflex forces can also be reduced by varying the material or material properties of the flexible body 12 between the central region 24 and the periphery 18. Another way to reduce reflex forces in the body 12 is to make the body to have a bend (not shown) between the concave portion 22 and the periphery 18 so the inner surface 16 of the body turns away from the mounting surface 26 when the holder is positioned adjacent the mounting surface. Yet another way to reduce reflex forces in the body 12 is to change the configuration of the body by adjusting the inner distance $D_I$, the outer distance $D_O$, and/or an internal size of the compartment.

FIG. 1 shows an embodiment of the holder 10 in which the periphery 18 is generally rectangular. The periphery 18 may be symmetric, such as circular, square, or oval, or non-symmetric. In one embodiment, the periphery 18 is non-circular. Other exemplary periphery 18 shapes include those corresponding to articles of clothing such as a shirt or shoe, structures such as a house, a vehicle such as a car, boat, or airplane, and articles of natures such as a fruit, flower, tree, person, or animal. Also, the body 12 may be colored or tinted as desired. For example, a heart-shaped holder (not shown) may be tinted red and a tree-shaped holder (not shown) may be tinted green and/or brown. The body 12 may be tinted and generally transparent.

The periphery 18, compartment 30, and opening 34 may have corresponding shapes, sizes, and/or locations. For example, as shown in FIG. 1, the compartment 30 may be rectangular corresponding to a rectangular periphery 18. As another example, the periphery 18 may be shaped as a mailbox (not shown) and the opening 34 to the compartment 30 may be located at an end of the mailbox shape corresponding to a door of the mailbox. As yet another example, in an embodiment of the body 12 having an opening 32 spaced from the periphery 18 (not shown), the periphery 18 is shaped as a kangaroo and the opening 34 is located and sized to correspond to a pouch of the kangaroo.

A user of the holder 10 may selectively position the item 32 in the compartment 30 through the opening 34 and remove the item from the compartment through the opening. For embodiments of the holder 10 having a generally transparent body 12, the user may display the item 32 in the holder for viewing through the body. Various items 32 may be part of or used in combination with the holder 10 without departing from the scope of the present invention, as long as the item does not interfere with creation and maintenance of the suction between the holder 10 and the mounting surface 26, as described above.

The item 32 may have various sizes, shapes, and material characteristics (e.g., stiffness) without departing from the scope of the present invention. For example, the item 32 may be generally circular, rectangular, square, or oval. The item 32 may also have a shape corresponding to a shape of the periphery 18 and/or compartment 30. For example, as shown in FIG. 1, the item 32 may be generally rectangular corresponding to a generally rectangular compartment 30 and periphery 18 or generally circular corresponding to a generally circular compartment and periphery. In some embodiments, the body 12 is configured so that positioning an overly-rigid item 32 in the compartment 30 will interfere with mounting the body on the mounting surface 26 by limiting an ability of the body to flex as needed to create sufficient suction between the body and the mounting surface.

The items 32 may have a predetermined or preselected size, shape, and stiffness. For example, a maker of the holder 10 may design items 32 specifically for use as part of or in combination with the holder. For example, items 32 can have a bend corresponding to a bend in the compartment 30 of the body 12. In one embodiment, the item 32 has a shape corresponding to a shape of the compartment 30 or the periphery 18. For example, the item 32 may be circular corresponding to a circular compartment 30 or square corresponding to a square compartment and periphery 18 (not shown).

In some embodiments, the body 12 can only be mounted on the mounting surface 26 when the item 32 is positioned in the compartment 30. Accordingly, bodies 12 can be less stiff and/or have a smaller thickness T corresponding to a stiffness that items 32 having a predetermined stiffness will add to the body when the item is positioned in the compartment 30. In those embodiments, the item 32 adds stiffness to the body 12 needed for mounting the body on the mounting surface 26. When a body 12 of these embodiments is pushed against the mounting surface 26, as described above, when it does not have an item 32 in the compartment 30, the body will have insufficient stiffness to create the suction forces needed for mounting the body on the mounting surface. On the other hand, when an item 32 having a stiffness within a range of predetermined or desired stiffnesses is positioned in the compartment 30 of a body 12 according to these embodiments, the body has sufficient stiffness to create the suction forces needed for mounting the body on the mounting surface. For example, in a particular embodiment, the range of predetermined stiffnesses include a stiffness of standard collector cards such as baseball, hockey, or other themed cards. Thus, the body 12 in this embodiment would only be mountable on the mounting surface when a collector card or other item 32 having a stiffness within the predetermined range is positioned in the compartment 30.

In another embodiment, the body 12 is mountable on the mounting surface 26 regardless of whether an item 32 is positioned in the compartment 30 or the compartment is empty. During use of holders 10 according to this embodiment, the user may position the item 32 in the compartment 30, mount the body 12 on the mounting surface 26, remove the item from the compartment, and demount the body from the mounting surface in any order. For example, a user may position an item 32 in the compartment 30, then mount the body 12 on the mounting surface 26, then remove the item from the compartment while the body is mounted on the mounting surface, and then position the same or another item in the compartment.

The item 32 may display a variety of information without departing from the scope of the present invention. The item 32 may display information about, for example, a famous person, a movie, or a business. In one embodiment, the item 32 is partially transparent or partially translucent. In this embodiment, information displayed on the item 32 will stand out when the item is positioned in the compartment and the body 12 is generally transparent. The item 32 may also have information such as drawings and/or words on both sides. For example, conventional sports-themed trading cards such as baseball cards include a picture of a particular player and the name and position of the player on a front of the card and player statistics on a back of the card. When such an item 32 is positioned in a generally transparent holder body 12, the information on the sides of the item can be viewed through the outer surface 14 and inner surface, respectively. When such an item 32 is then mounted on a generally transparent mounting surface 26 such as a window, the information on a side of the item positioned adjacent the outer surface 14 can be viewed through the outer surface and the information on the other side of the item can be viewed through the inner surface 16 and the transparent mounting surface.

The periphery 18 of the body 12 may have a shape corresponding to that which the item 32 displays. For example, the periphery 18 may be shaped as a football and the compartment 30 may be sized and shaped to hold traditional or custom-shaped football trading/collector cards. As another example, the periphery 18 may be shaped as an apple and a user may position an item 32 including an advertisement for a dentist or other doctor in the compartment 30.

The items 32 may have various purposes without departing from the scope of the present invention. For example, the item may display art. Another example item is an electronic pass card. For this example, a highway authority may provide holders 10 to regular highway users for holding a pass card (not shown). The pass cards may include an element detectable by system sensors positioned along the highway to acknowledge the user has paid their fees for using the highway toll system. Such a holder may be mounted on, among other places, an inside of a vehicle window such as a front windshield. Another exemplary item 32 is an identification card such as a driver's license (not shown). The driver's license may be custom made for use with particular holders 10 such as by having a special shape and/or stiffness corresponding to shape and stiffness of the body 12. For example, a less stiff license 32 may be used with a stiffer body 12.

In some embodiments, the user may position generally thin low-stiffness items 32 such as a standard piece of paper in the compartment 30. For example, a child may draw on a small piece of paper, position it in the compartment 30, and mount the body 12 on the mounting surface 26 for displaying the drawing. The item 32 may also include a small piece of art or a photo, such as a standard wallet-sized photo. In this way, the holder 10 can be used as a portable picture frame. As other examples, the user may write a shopping list, appointment, or other reminders on a piece of paper before positioning the paper in the compartment for display by mounting the body 12 on the mounting surface 26.

In one embodiment of the present invention, the item 32 includes aromatic or fragrant material. For example, the item 32 can include an aromatic fluid, such as a liquid that emits a pleasant aroma. In one embodiment, the aromatic fluid is a gel. The aromas that the item 32 may be designed to emit are not limited. Exemplary aromas include various floral aromas, fruit scents such as lemon, orange, kiwi, and grapefruit, and other common scents such as lavender, vanilla, eucalyptus, chamomile, sage, and pine. The item 32 may be designed to release a desired and predetermined or preselected aroma and may be designed to release the aroma continuously for a limited time or an unlimited time. In one embodiment, the item 32 is a fluid that diminishes, such as by evaporation, as it releases the desired aroma. In this embodiment, the user can replenish the compartment 30 with more of the same fragranced item 32 or with an item having a different fragrance. The device 10 can be sold with replenishing quantities of the aromatic item. For example, the device 10 can be packaged and sold with small containers of the same or variously fragranced replacement fluid.

The item 32 may be an aromatic display item and the particular aroma of the item may correspond to that which the item displays. For example, the item 32 may include a theme card, similar to a traditional sports trading card, displaying butterflies in a garden and having a floral aroma. Aromatic fluids may also be used as display items. For example, the item 32 may include a fluid having a desired aroma or a desired color that can be displayed through a transparent body 12. In one embodiment, any combination of the aroma of the item 32, the item shape, the periphery 18 shape, and that which the item displays (e.g., the color of the item) may be related. For example, in one embodiment the periphery 18 is shaped as a banana, the body 12 is transparent or tinted or colored yellow, and the item 32 emits a banana aroma and may be yellow in color. As another example, a pine tree-shaped periphery 18 may include a green-colored fluid emitting a pine smell.

The body 12 may be configured to promote the release of aroma from fragrant items 32. For example, the opening 34 can be shaped to allow greater release of aroma from the item 32 when it is positioned in the compartment 30. In one embodiment, this is accomplished by designing a larger opening 34. A larger opening 34 allows more air to pass over an exposed surface of the item 32 when it is positioned in the compartment 30, which increases the amount of aroma emitted by the item or at least ensures emission. In another embodiment, configuring the body 12 to promote the release of aroma from the item 32 when it is positioned in the compartment 30 includes making the body of a material that is porous or otherwise permeable with respect to the aroma to allow the aroma to pass from the item in the compartment and through the body to outside of the body. The body 12 may have multiple features designed to promote the release of the aroma from the item 32. For example, the body 12 may include an opening configured to release aroma and a permeable material allowing the aroma to pass through the body.

The body 12 may include scented material. For example, the body 12 may be made of a plastic material that has been impregnated with a gel, an oil, or pellets that render the body 12 scented as desired. Possible scents include but are not limited to those described above regarding the item 32. In one particular embodiment (not shown in detail), the body 12 is made of a scented material and does not include a compartment 30. In this embodiment, the holder 10 can hold a scented material as the item 32 (e.g., which can be impregnated into the body) without use of a compartment 30.

As shown in FIG. 1, the holder 10 may include a message 36 displayed on the outer surface 14 of the flexible body 12, on the inner surface 16 of the body, and/or between them. Various types of messages 36 may be displayed on or in the flexible body 12 for various reasons without departing from the scope of the present invention. For example, words, logos, and/or art may be displayed on or in the flexible body 12 for aesthetic and/or communication purposes. The message 36 shown in FIG. 1 includes multiple baseballs. The message 36 may be secured to or formed in the body 12 in various ways without departing from the scope of the present invention. For example, the message 36 may be printed on the outer surface 14 or inner surface 16 of the body 12. The message 36 may also be printed on a label adhered to the outer surface 14 and the label may be fully or partially opaque, translucent, and/or transparent as desired. It is contemplated that the message 36 may be formed using material of the flexible body 12 by, for example, molding, melting, etching, or engraving the message into the outer surface 14 of the body.

The message 36 may be colored as desired and, as described above, the flexible body 12 may be colored or tinted as desired. The shape of the body 12, the color of the body, the message 36, and the color of the message may be selected to relate to each other as desired. For example, in one embodiment (not shown), a golf ball inspired holder has a generally circular periphery, a message including actual dimples or a rendition of dimples printed or otherwise displayed on the outer surface of the body, and a white body. The message 36 may correspond to the item 32 expected to be positioned in the compartment 30. For example, FIG. 1 shows a message 36 including baseballs corresponding to the item 32 being a baseball card. Further, the message 36 may correspond in size, shape, and/or location(s) to the item 32 expected to be positioned in the compartment 30. For example, the baseballs 36 shown in FIG. 1 are sized and located on the body 12 so they will be positioned adjacent blank portions 38 of the baseball card 32 when the card is positioned in the compartment 30. In one embodiment, the message 36 includes a border, including flowers for example, that surrounds photos and other items 32 positioned within the compartment 30.

The message 36 may also correspond to any or all of the aroma of the item 32, the shape of the item, and the periphery 18 shape. For example, in one embodiment, the periphery 18 is shaped as an orange, the message 36 includes printed or actual dimples and may be colored or tinted orange, the item 32 is designed to emit an orange fruit aroma, and the item may be colored orange.

It is contemplated that the holder 10 may include a closure (not shown) for selectively sealing the compartment 30. As an example, the body 12 may include a zipper-type seal conventionally used to seal some plastic items (e.g., plastic bags). The zipper-type seal may be positioned adjacent the opening 32 for selectively sealing and opening the compartment 30. The user may position the item 32 in the compartment, seal the compartment by closing the closure, and mount the body 12 on the mounting surface 26. Later, as desired, the user may easily open the closure to unseal the compartment and remove the item. In some embodiments of the invention where the item 32 has a predetermined desired aroma, as described above, a user may selectively open and close the closure to control the amount of aroma emitted from the holder 10. In some embodiments, a user may control the diminishment or evaporation of the item 32 by selectively opening and closing the compartment 30 using the closure. For example, a user can position a fragrant item 32 in the compartment 30, mount the body 12 on a hallway mirror in their home, and only open the closure when they have guests over their house, closing it after the guests leave to preserve the item for a later use.

The item holder 10 may be used in various ways without departing from the scope of the present invention. As described above, to use the holder 10, a user inserts the item 32 into the compartment 30 of the flexible body 12 and mounts the holder on a generally smooth and generally non-porous mounting surface 26. Exemplary uses of the holder 10 include storing and/or displaying items 32 on a home refrigerator or mirror. The user can also store and/or display items 32 on a smooth surface 26 at work or elsewhere. A benefit of the present invention is flexibility to relocate the holder 10 on generally any smooth and non-porous mounting surface 26 as desired. For this reason, the holder 10 is said to be portable.

The holder 10 may be used to hold an item 32 usable while the holder is removed from the mounting surface 26. For example, the holder 10 can be used to hold a thin element connected to a key (not shown), which may be used to open a lock after the holder is demounted from the mounting surface 26. In this example, the element or the key and the element may be considered the item 32. The holder 10 may also hold an item 32 that is used for reasons other than display while the holder is secured to the mounting surface 26. For example, in one embodiment (not shown), the holder 10 holds a thin element attached to a writing pen by a tether that is long enough to allow use of the pen on a nearby writing surface while the holder is secured to the mounting surface 26. In this example, the holder 10 may also be configured to allow the user to store the pen in or on the holder when the pen is not being used. Using the holder 10 to hold highway pass cards, as described above, is yet another example of items 32 that can be held in the holder and used for reasons other than display.

As describe above, securing the holder 10 to the mounting surface 26 includes positioning the inner surface 16 of the flexible body 12 adjacent the mounting surface while the body is in its default shape thereby forming the cavity 28 between the body and the mounting surface. Then, the flexible body 12 is moved to its actuated shape thereby sealing the body against the mounting surface 26 and forcing fluid such as air out of the cavity 28 to create a suction between the flexible body and the mounting surface. Sealing the suction between the flexible body 12 and the mounting surface 26 secures the body to the mounting surface. To demount the flexible body 12 from the mounting surface 26, for example to relocate the holder 10 on another smooth mounting surface or for using the item before remounting the holder, the body is moved out of its actuated shape thereby breaking the seal and suction. To break the seal and move the body 12 out of its actuated shape, the user may move or pull on a portion of the periphery 18, a portion of the item 32 that may extend from the compartment 30, or something attached to the holder 10 or the item.

FIG. 4 shows an item holder 40 according to another embodiment of the present invention. The holder 40 according to this embodiment has a flexible or deformable body 42 including an outer surface 44, an inner surface 46, and a periphery 48 extending around the body and surrounding the inner surface and the outer surface. The outer surface 44 may include a convex portion 50. The inner surface 46 includes a concave portion 52 opposite the outer surface 44. The outer surface 44 may be substantially free of protrusions. In one embodiment, the convex portion 50 is substantially free of protrusions.

The flexible body 42 further includes a sealed compartment 54 extending through the body between the outer surface 44 and the inner surface 46 of the body for holding the item 32 during use of the holder 40. In this embodiment, the body 42 of the holder 10 completely envelopes or surrounds the item 32. The compartment 54 may be releasably or permanently sealed. The compartment 54 may be sealed in a variety of ways without departing from the scope of the present invention. For example, in one embodiment the body 42 is molded or otherwise formed around the item. In another embodiment, the compartment 54 is formed to include an opening (similar to the opening 34 shown in FIG. 3), the item 32 is positioned in the compartment, and then the opening is closed to seal the compartment. In this embodiment, the opening may be closed in a variety of ways, such as by using an adhesive or by welding opposite sides of the opening together.

The compartment 54 may be sized and shaped in various ways without departing from the scope of the present invention, as long as the suction between the holder 10 and the mounting surface 26 can be created and maintained during and after mounting of the body 42 on the mounting surface. In one embodiment, the compartment has a height $H_C$ that is between about 17% and about 95% of a height $H_B$ of the body 42. For example, in a particular embodiment, the compartment height $H_C$ is between about 2 inches and about 11 inches and the body height $H_B$ is between about 2.5 inches and about 11.5 inches.

The holder 40 according to this embodiment may hold and/or include any of the items 32 described above regarding other embodiments of the invention. For example, the holder 40 may hold a baseball trading card or a desired fragrant fluid. For embodiments of the holder 40 used with and/or including an item 32 having a desired aroma, the body 42 may be configured to promote the emission of the aroma, as described above regarding other embodiments. For example, the body 42 may be porous or otherwise permeable, thereby allowing the aroma from the item 32 to permeate from the item in the compartment 54 and through the body to outside of the holder 40. The item holder 40 of this embodiment is otherwise identical to holders of earlier described embodiments and therefore will not be described in further detail.

Figure 5:
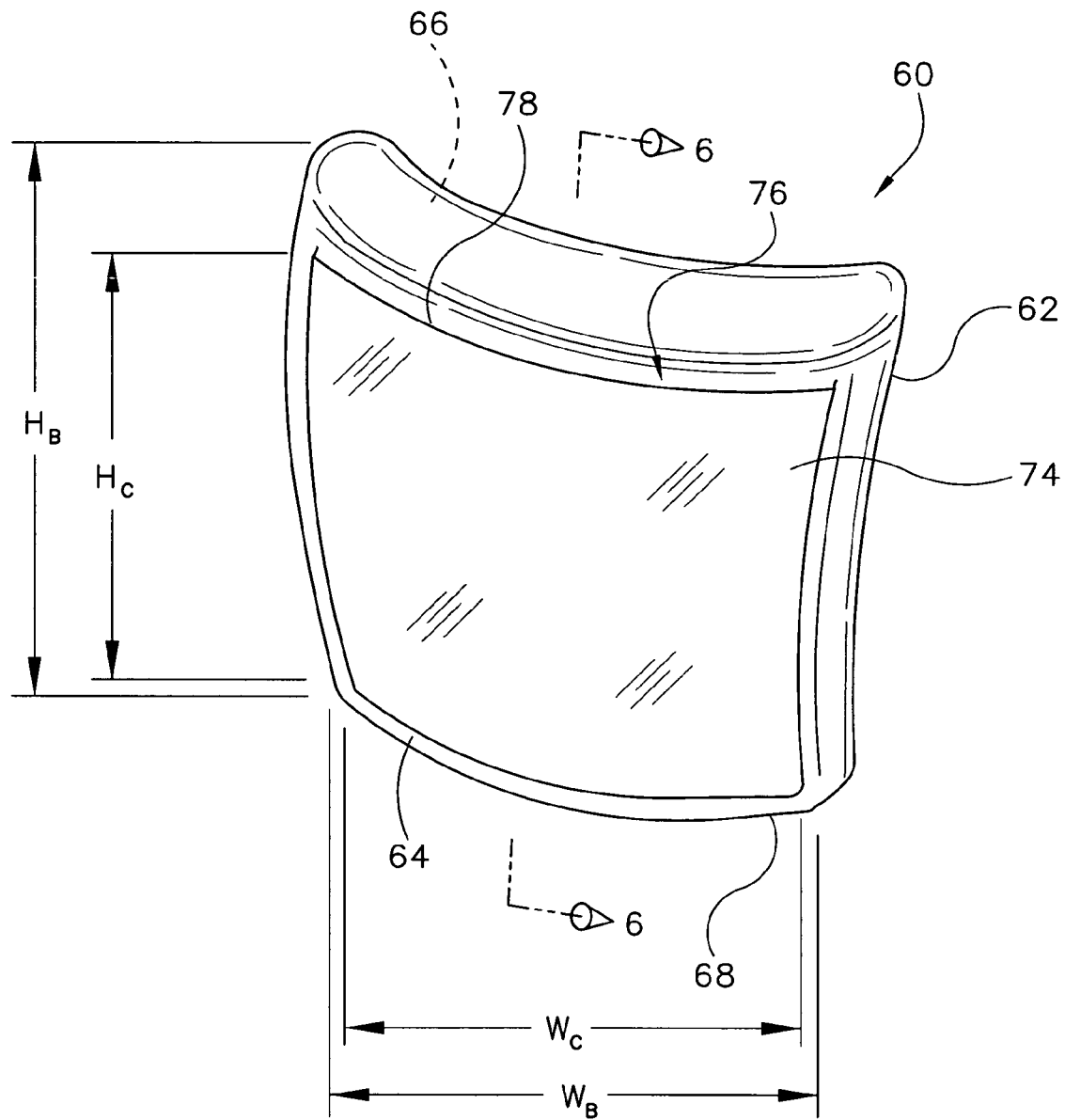
FIG. 5 is a perspective of an item holder according to a third embodiment of the present invention.

FIG. 5 shows an item holder 60 according to yet another embodiment of the present invention. The holder 60 according to this embodiment has a flexible or deformable body 62 including an outer surface 64, an inner surface 66, and a periphery 68 extending around the body and surrounding the inner surface and the outer surface. As shown in FIG. 6, the outer surface 64 may include a convex portion 70. The inner surface 66 includes a concave portion 72 opposite the outer surface 64. The holder 60 includes a film or sheet 74 attached to the outer surface 64 of the body 62. The film 74 may be attached to the body 62 in various ways without departing from the scope of the present invention. For example, in one embodiment the film 74 is welded to the body 62. In another embodiment, the film 74 is attached to the body 62 using an adhesive.

The film 74 and body 62 may form a compartment 76 between them for holding the item 32 (shown in FIGS. 1 and 6) during use of the holder 60. The film 74 and outer surface 64 of the body 62 may also form an opening 78 for selectively accessing the compartment 76. The user may selectively position the item 32 in the compartment 76 and remove the item from the compartment. The body 62, film 74, compartment 76, and opening 78 may be sized and shaped in various ways without departing from the scope of the present invention, as long as the suction between the holder 60 and the mounting surface 26 can be created and maintained when mounting the body 62 on the mounting surface.

As shown in FIG. 5, the compartment 76 may be generally rectangular, have a generally constant width $W_C$, and have a generally constant height $H_C$. The opening 78 may have a width that is about the same as the compartment width Wc. In one embodiment, the compartment width $W_C$ is between about 22% and about 95% of a width $W_B$ of the flexible body 62. In one embodiment, the compartment height $H_C$ is between about 17% and about 95% of a height $H_B$ of the body 12. For example, in a particular embodiment, the compartment width $W_C$ is between about 2 inches and about 8.5 inches, the compartment height $H_C$ is between about 2 inches and about 11 inches, the body width $W_B$ is between about 2.5 inches and about 9 inches, and the body height $H_B$ is between about 2.5 inches and about 11.5 inches.

The compartment 76 and opening 78 may be located in a variety of positions without departing from the scope of the present invention, as long as the suction between the holder 60 and the mounting surface 26 can be created and maintained as described above. In one embodiment, as shown in FIGS. 5 and 6, the opening 78 may be located adjacent the periphery 68, and in another embodiment (not shown), the opening is located at a portion of the film 74 that is spaced from the periphery 68.

In some embodiments, the body 62 can only be mounted on the mounting surface 26 when the item 32 is positioned in the compartment 76. Accordingly, bodies 62 may be less stiff and/or have a smaller thickness T corresponding to a stiffness that items 32 having a predetermined stiffness will add to the body when positioned in the compartment 76. In these embodiments, the item 32 adds stiffness to the body 62 needed for mounting the body on the mounting surface 26. When a body 62 of these embodiments is pushed against the mounting surface 26, as described above, when the item is not positioned in the compartment 76, the body will have insufficient stiffness to create the suction forces needed for mounting the body on the mounting surface. On the other hand, when an item 32 having a stiffness within a range of predetermined or desired stiffnesses is positioned in the compartment 76 of a body 62 according to these embodiments, the body has sufficient stiffness to create the suction forces needed for mounting the body on the mounting surface. For example, in a particular embodiment, the range of desired stiffnesses include a stiffness of standard trading cards such as baseball, hockey, or other themed cards. Thus, the body 12 in this embodiment would only be mountable on the mounting surface when a trading card or other item 32 having a stiffness within the desired range is positioned in the compartment 76.

In another embodiment, the body 62 is mountable on the mounting surface 26 regardless of whether an item 32 is positioned in the compartment 76 or the compartment is empty. During use of holders 60 according to this embodiment, the user may position the item 32 in the compartment 76, mount the body 62 on the mounting surface 26, remove the item from the compartment, and demount the body from the mounting surface in any order. For example, a user may position an item 32 in the compartment 76, then mount the body 62 on the mounting surface, then remove the item from the compartment while the body is mounted on the mounting surface, and then position the same or another item in the compartment.

It is contemplated that the holder 60 may include a closure (not shown) for selectively sealing the compartment 76. As an example, the body 62 may include a conventional zipper-type seal positioned adjacent the opening 78. The user may position the item 32 in the compartment, seal the compartment by closing the closure, and mount the body 62 on the mounting surface 26. Later, as desired, the user may open the closure to unseal the compartment and remove the item.

As described above regarding other embodiments having a closure and where the item 32 has a predetermined desired aroma, a user may selectively open and close the closure to control the amount of aroma emitted from the holder 60. A user can also control the diminishment or evaporation of the item 32 by selectively opening and closing the compartment 76 using the closure. For example, a user can position a fragrant item 32 in the compartment 76, mount the body 62 on a hallway mirror in their home, and only open the closure when they have guests, closing it after their guests leave to preserve the item for a later use.

The film 74 may be made of various materials without departing from the scope of the present invention. The film 74 may be made of a deformable or flexible material. In one embodiment, the film 74 is made of polyethylene, polypropylene, polyvinyl chloride, cellulosics, or a material including silicone or other elastomeric material. The film 74 may be generally transparent for displaying the item 32 through the film when the item is positioned in the compartment 76. The film 74 may be colored or tinted in various ways. The holder 60 may include a message (similar to the message 36 described above) displayed on the body 62 and/or the film 74. A message may be printed, etched, or otherwise formed on the body as described above with respect to other embodiments and/or on the film in similar ways. For example, the holder 60 may include a message printed on the film 74. The item holder 60 of this embodiment is otherwise identical to holders of earlier described embodiments and therefore will not be described in further detail. The message may correspond to the item such as by having related spacing, coloring, or themes.

In one embodiment, the film 74 is made of a scented material. For example, the film 74 may be made of a material that has been impregnated with a gel, an oil, or pellets that render the film 74 scented as desired. Exemplary film 74 materials include scented cellulosics and other scented materials including silicone or other elastomeric material. In one particular embodiment, the film 74 is made of a scented material and is coated onto or otherwise attached to the body 12. For example, the scented film 74 may be sprayed onto the body 12 or the body 12 may be dipped into a scented material to form the scented film. Possible scents include but are not limited to those described above regarding the item 32 and the body 12.

In one embodiment, any combination of an aroma of the item 32, an aroma of the film 74, an aroma of the body 12, the item shape, the periphery 18 shape, and that which the item displays (e.g., the color of the item) may be related.

The holder 60 according to this embodiment may hold and/or include any of the items 32 described above regarding other embodiments. For example, the holder 60 may hold a baseball trading card or a desired fragrant fluid. For embodiments of the holder 60 used with and/or including an item 32 having a desired aroma, the body 62 and/or the film 74 may be configured to promote the emission of the aroma, as described above regarding the bodies 12, 42 of other embodiments. For example, the film 74 may be porous or otherwise permeable, thereby allowing the aroma from the item 32 to permeate from the compartment 76 and through the body and/or film to outside of the holder 60. In one embodiment, the opening 78 is configured to promote release of the aroma from the item 32. The item holder 60 of this embodiment is otherwise identical to holders of earlier described embodiments and therefore will not be described in further detail.

FIG. 7 shows an item holder 80 according to still another embodiment of the present invention. The holder 80 of this embodiment has a flexible or deformable body 82 including an outer surface 84, an inner surface 86, and a periphery 88 extending around the body and surrounding the inner surface and the outer surface. The outer surface 84 may include a convex portion 90. The inner surface 86 includes a concave portion 92 opposite the outer surface 84. The holder 80 includes a film or sheet 94 attached to the outer surface 84 of the body 82. The film 94 may be attached to the body 82 in various ways without departing from the scope of the present invention. In one embodiment the film 94 is welded to the body 82. In another embodiment, the film 94 is attached to the body 82 using an adhesive.

The film 94 and the body 82 form a sealed compartment 96 between them for holding the item 32 during use of the holder 80. In other words, the film 94 and the body 82 completely envelope the item 32 positioned therein. The item 32 may be sealed in the compartment 96 in a variety of ways without departing from the scope of the present invention. In one embodiment, the item 32 is positioned adjacent the outer surface 84 of the body 82 and then the film 94 is attached to the outer surface around the item thereby forming the sealed compartment 96 holding the item. In another embodiment, the film 94 is attached to the outer surface 84 at all points around the film except at an opening (similar to the opening 78 shown in FIG. 6). Next, in this embodiment, the item 32 is positioned in the compartment 96 and then the compartment is sealed by closing the opening thereby forming the sealed compartment holding the item. The opening may be sealed in a variety of ways, such as by welding or using an adhesive. The item holder 80 of this embodiment is otherwise identical to holders of earlier described embodiments and therefore will not be described in further detail.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. An item holder mountable by suction on a generally smooth mounting surface comprising:
   a deformable body including:
      an outer surface;
      an inner surface having a concave portion opposite said outer surface;
      a periphery extending around the body and surrounding the outer surface and the inner surface;
      a compartment extending through the body between the outer surface and inner surface; and an item including material emitting a desired aroma removably positioned within said compartment;

wherein the body is configured to allow emission of the aroma from the holder, including the body having a permeable material allowing emission of the aroma through the body when the item is positioned in said compartment;

wherein the compartment has an opening adjacent said periphery for inserting the item into the compartment and removing the item from the compartment; and wherein the body is deformable from an undeformed shape to an actuated shape to mount the holder on the mounting surface by positioning the inner surface of the body adjacent the mounting surface when the body is in its undeformed shape thereby forming a cavity between the body and the mounting surface and deforming the body to its actuated shape thereby sealing the body against the mounting surface and forcing fluid out of the cavity to create a suction between the body and the mounting surface thereby securing the body to the mounting surface.

2. An item holder as set forth in claim 1 wherein said periphery varies from circular.

3. An item holder as set forth in claim 2 wherein said periphery has a generally rectangular shape.

4. An item holder as set forth in claim 1 wherein said compartment has a shape corresponding to a shape of the periphery.

5. An item holder as set forth in claim 1 wherein said outer surface is substantially free of protrusions.

6. An item holder as set forth in claim 1 wherein the body is mountable by suction on the mounting surface only when said item is positioned in said compartment, the item adding stiffness to the body needed for mounting the body on the mounting surface.

7. An item holder as set forth in claim 1 wherein a distance between the compartment and the inner surface is generally greater than a distance between the compartment and the outer surface.

8. An item holder as set forth in claim 1 wherein the body has a generally constant width.

9. An item holder as set forth in claim 8 wherein the compartment has a generally constant width that is between about 22% and about 95% of the width of the body.

10. An item holder as set forth in claim 1 wherein said body includes material emitting a desired aroma.

11. An item holder as set forth in claim 1 wherein said body is coated with a material emitting a desired aroma.

12. An item holder as set forth in claim 1 wherein said item includes a fluid.

13. An item holder as set forth in claim 1 wherein the aroma of said item material relates to at least one item-holder characteristic selected from a group of item-holder characteristics consisting of:
   (a) a shape of the periphery of the body; and
   (b) a display feature of the item.

14. An item holder as set forth in claim 13 wherein the item is an aromatic display item and the aroma of the item corresponds to that which the item displays.

15. An item holder as set forth in claim 1 wherein the body is generally visually transparent and said item is a theme card.

16. An item holder as set forth in claim 1 wherein at least two characteristics of the item selected from a group of characteristics consisting of the aroma of the item, a shape of the item, a shape of the body periphery, and a display feature of the item, are related to each other.

17. An item holder as set forth in claim 1 wherein the opening of the body is shaped to promote release of the aroma from the item.

18. An item holder as set forth in claim 1 wherein the body includes a message displayed from at least one location selected from a group of locations consisting of the outer surface of the body, the inner surface of the body, and between the inner surface and the outer surface.

19. An item holder as set forth in claim 1 further including a closure connected to the body adjacent the opening for selectively sealing and unsealing the compartment.

20. An item holder as set forth in claim 1 wherein the deformable body is generally visually transparent.

21. An item holder mountable by suction on a generally smooth mounting surface comprising:
   a deformable body including:
      an outer surface;
      an inner surface having a concave portion opposite said outer surface;
      a periphery extending around the body and surrounding the outer surface and the inner surface;
      a sealed compartment extending through the body between the outer surface and inner surface, wherein the body completely surrounds the compartment; and
   an item including material emitting a desired aroma positioned within the sealed compartment;
   wherein the body is configured to allow emission of the aroma from the holder, including the body having a permeable material allowing emission of the aroma through the body when the item is positioned in the compartment; and
   wherein the body is deformable from an undeformed shape to an actuated shape to mount the holder on the mounting surface by positioning the inner surface of the body adjacent the mounting surface when the body is in its undeformed shape thereby forming a cavity between the body and the mounting surface and deforming the body to its actuated shape thereby sealing the body against the mounting surface and forcing fluid out of the cavity to create a suction between the body and the mounting surface thereby securing the body to the mounting surface.

22. An item holder as set forth in claim 21 wherein the deformable body is visually transparent for displaying said item through the body when the item is held in the compartment.

23. An item holder as set forth in claim 21 wherein the periphery varies from circular.

24. An item holder as set forth in claim 21 wherein said outer surface is substantially free of protrusions.

25. An item holder as set forth in claim 21 wherein said body is mountable by suction on the mounting surface only when said item is positioned in said compartment, the item adding stiffness to the body needed for mounting the body on the mounting surface.

26. An item holder as set forth in claim 21 wherein said body includes material emitting a desired aroma.

27. An item holder as set forth in claim 21 wherein said body is coated with a material emitting a desired aroma.

28. An item holder as set forth in claim 1 wherein the deformable body is generally visually transparent for displaying said item through the body when the item is held in the compartment.

29. An item holder as set forth in claim 21 wherein said periphery has a generally rectangular shape.

30. An item holder as set forth in claim 21 wherein said compartment has a shape corresponding to a shape of the periphery.

31. An item holder as set forth in claim 21 wherein a distance between the compartment and the inner surface is generally greater than a distance between the compartment and the outer surface.

32. An item holder as set forth in claim 21 wherein the body has a generally constant width.

33. An item holder as set forth in claim 32 wherein the compartment has a generally constant width that is between about 22% and about 95% of the width of the body.

34. An item holder as set forth in claim 21 wherein said item includes a fluid.

35. An item holder as set forth in claim 21 wherein the aroma of said item material relates to at least one item-holder characteristic selected from a group of item-holder characteristics consisting of:
(a) a shape of the periphery of the body; and
(b) a display feature of the item.

36. An item holder as set forth in claim 35 wherein the item is an aromatic display item and the particular aroma of the item corresponds to that which the item displays.

37. An item holder as set forth in claim 21 wherein said item is a theme card.

38. An item holder as set forth in claim 21 wherein at least two characteristics of the item selected from a group of characteristics consisting of the aroma of the item, a shape of the item, a shape of the body periphery, and a display feature of the item, are related to each other.

39. An item holder as set forth in claim 21 wherein the body includes an opening configured to promote the release of the aroma from the item.

40. An item holder as set forth in claim 21 wherein the body includes a message displayed from at least one location selected from a group of locations consisting of the outer surface of the body, the inner surface of the body, and between the inner surface and the outer surface.

* * * * *